US006643264B1

(12) United States Patent
Furusawa et al.

(10) Patent No.: US 6,643,264 B1
(45) Date of Patent: Nov. 4, 2003

(54) ATM EXCHANGE

(75) Inventors: Satoshi Furusawa, Tokyo (JP);
Kazuyuki Horioka, Tokyo (JP); Hideki Ohhashi, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/441,441

(22) Filed: Nov. 17, 1999

(30) Foreign Application Priority Data

Nov. 27, 1998 (JP) ............................................ 10-337013

(51) Int. Cl.[7] ......................... G01R 31/08; G06F 11/00; G08C 15/00; H04J 1/16; H04J 3/14
(52) U.S. Cl. ................................ 370/236.1; 370/230.1; 370/236.2
(58) Field of Search ................................ 370/229, 230, 370/235, 236.1, 235.1, 231, 236, 395.1, 395.42, 395.43, 236.2, 395, 254, 253

(56) References Cited

U.S. PATENT DOCUMENTS

| | | | | |
|---|---|---|---|---|
| 5,777,984 A | * | 7/1998 | Gun et al. | 370/230 |
| 5,914,936 A | * | 6/1999 | Hatono et al. | 370/230 |
| 5,966,381 A | * | 10/1999 | Buckley et al. | 370/236.1 |
| 5,991,265 A | * | 11/1999 | Lincoln | 370/236.1 |
| 6,072,989 A | | 6/2000 | Witters et al. | |
| 6,084,857 A | * | 7/2000 | Takamichi | 370/236 |
| 6,141,321 A | * | 10/2000 | Lee | 370/229 |
| 6,175,568 B1 | * | 1/2001 | Awdeh | 370/236.1 |
| 6,192,033 B1 | * | 2/2001 | Benson et al. | 370/236 |
| 6,198,742 B1 | * | 3/2001 | Saito et al. | 370/236.1 |
| 6,208,653 B1 | * | 3/2001 | Ogawa et al. | 370/395.52 |
| 6,301,226 B1 | * | 10/2001 | Lincoln | 370/229 |
| 6,404,767 B1 | * | 6/2002 | Depelteau et al. | 370/395.1 |
| 6,556,542 B1 | * | 4/2003 | Sudo et al. | 370/236.1 |

FOREIGN PATENT DOCUMENTS

| | | |
|---|---|---|
| JP | A-9-149047 | 6/1997 |
| JP | A-9-162869 | 6/1997 |

OTHER PUBLICATIONS

S.K. Biswas et al., "Connection Splitting: An Efficient Way of Reducing Call Blocking in ATM" IEEE GlobalCom 1998, pp. 2412–2418.

\* cited by examiner

*Primary Examiner*—Ricky Ngo
*Assistant Examiner*—Yvonne Q. Ha
(74) *Attorney, Agent, or Firm*—Venable; James R. Burdett

(57) ABSTRACT

The ATM exchange of the present invention comprises an input line interface and an output line interface. The input line interface comprises an FRM extractor for deciding whether each ATM cell sent from a first communication terminal to a switch is an FRM cell or a non-FRM cell, an FRM cycle monitor for using this decision result to monitor the FRM cell proportion among the ATM cells and deciding whether said proportion is normal or abnormal, and a first cell processor for discarding the non-FRM cells when the proportion is abnormal. The output line interface comprises a BRM extractor for deciding whether each ATM cell sent from a communication terminal to a switch is a BRM cell or a non-BRM cell, a BRM cycle monitor for using this decision result to monitor the BRM cell proportion among the ATM cells and deciding whether said proportion is normal or abnormal, and a second cell processor for discarding the non-BRM cells when the proportion is abnormal. When the FRM cycle monitor decides that the quantity of flow of FRM cells has decreased, the first cell processor discards the non-FRM cells and returns the proportion of FRM cells to its normal state. When the BRM cycle monitor decides that the quantity of flow of BRM cells has decreased, the second cell processor discards the non-BRM cells and returns the proportion of BRM cells to its normal state.

20 Claims, 8 Drawing Sheets

FIG.2

| | 8 | 7 | 6 | 5 | 4 | 3 | 2 | 1 |
|---|---|---|---|---|---|---|---|---|
| 1 | GFC(Generic Flow Control) | | | | VPI(Virtual Path Identifier) | | | |
| 2 | VPI | | | | | | | |
| 3 | VCI(Virtual Channel Identifier) | | | | | | | |
| 4 | | | | | PT(Pay load Type) | | | CLP |
| 5 | HEC(Header Error Control) | | | | | | | |
| 6 | ID(Protocol ID) | | | | | | | |
| 7 | DIR | BN | CI | NI | RA | Reserve | | |
| 8 | | | | | | | | |
| 9–10 | ER(Expricit Cell Rate) | | | | | | | |
| 11–12 | CCR(Current Cell Rate) | | | | | | | |
| 13 | MCR(Minimum Cell Rate) | | | | | | | |
| 14–17 | QR(Queue Length) | | | | | | | |
| 18–21 | SN(Sequence Number) | | | | | | | |
| 22–51 | Reserved | | | | | | | |
| 52 | | | | | | | | |
| 53 | CRC-ID(Cyclic Redundancy Check) | | | | | | | |

FIG.7

| detf1 | q1 | q2 | s1 | s2 | Evaluation |
|---|---|---|---|---|---|
| 1 | — | — | b | b | normal |
| 0 | 1 | — | c | a | hold |
|   | 0 | 1 | b | c | hold |
|   |   | 0 | a | a | violation |

FIG.9

| detf2 | detfb | q3 | s3 | Evaluation |
|---|---|---|---|---|
| 0 | 1 | — | b | normal |
|   | 0 | — | a | hold |
| 1 | 1 | — | b | normal |
|   | 0 | 1 | c | normal |
|   |   | 0 | a | abnormal |

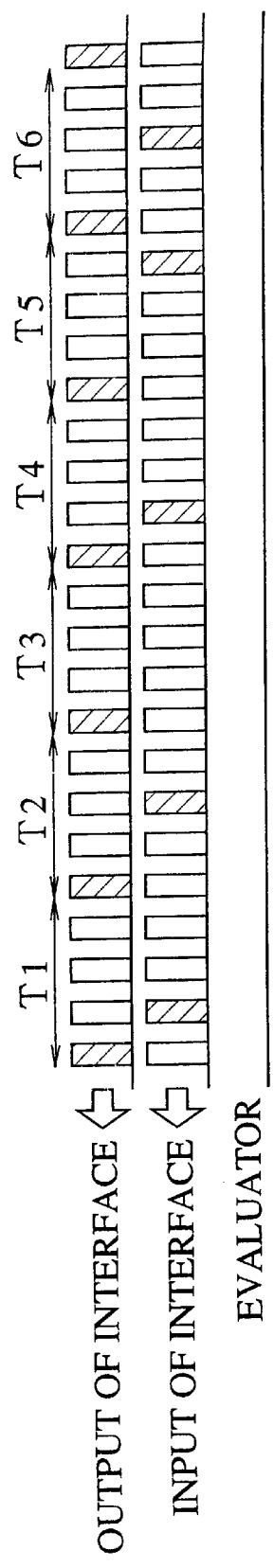
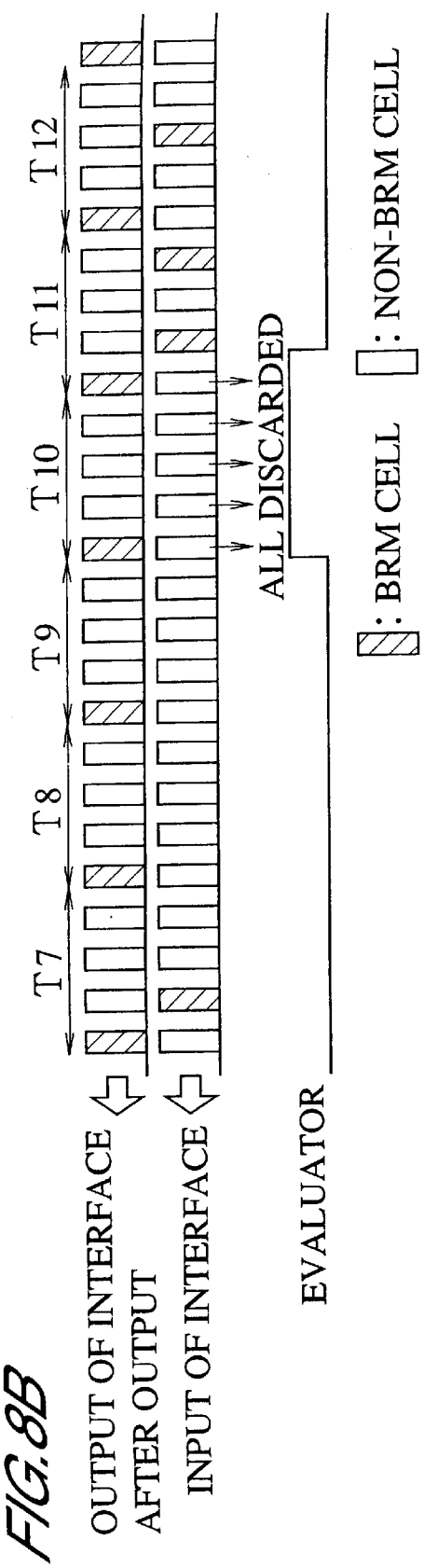

ATM EXCHANGE

BACKGROUND OF THE INVENTION

1. Field of the Invention

The present invention relates to an asynchronous transfer mode (ATM) exchange that performs communication by utilizing an available bit rate (ABR) service, and more particularly the present invention relates to an ATM exchange of a configuration in which a virtual destination and virtual source are constructed within a control loop.

2. Description of Related Art

An ABR service is a communication service in which the communication rate fluctuates according to the traffic on a network. With an ABR service, a minimum cell rate (MCR) and a peak cell rate (PCR) are set in the connection of a sending terminal and a network. A sending terminal is able to send at a communication rate equal to or greater than the MCR. If there is room in the network resources, the sending terminal can increase the communication rate, as long as the PCR is not exceeded.

An ABR service uses traffic control cells called resource management cells (RM cells) in order to determine how congested the network is. The sending terminal sends one RM cell every time a specific number of user cells are sent to a receiving terminal. This RM cell is called a forward RM cell (FRM cell). The receiving terminal obtains information about network congestion from the reception status of the user cells. Every time an FRM cell is received, the receiving terminal appends congestion information to this FRM cell and sends it back to the sending terminal. The returned RM cell is called a backward RM cell (BRM cell). The rate that is acceptable to an ATM exchange or other such device is sometimes clearly written to a BRM cell when it passes through such a device. The sending terminal controls the sending rate by using the information it reads from the received BRM cells.

Because the traffic control loop between the sending terminal and receiving terminal is extremely long, there is sometimes a problem in that it takes longer to communicate an RM cell. An ATM switch is sometimes used as an ATM exchange in order to solve this problem. An ATM switch constructs a virtual destination (VD) and a virtual source (VS) within a control loop. The VD and VS divide the control loop into two segments, namely, a segment containing the sending terminal and the VD and a segment containing the VS and the receiving terminal.

Each segment independently manages the RM cells. In a network that uses an ATM switch, however, the sending terminal and receiving terminal perform communication without recognizing the presence of the VD and VS. Specifically, the sending terminal does not recognize whether it is communicating with a receiving terminal or a VD, and the receiving terminal does not recognize whether it is communicating with a sending terminal or a VS. Therefore, the ratio of FRM cells and user cells must be equal on the VD and VS sides of the ATM switch. Similarly, the ratio of BRM cells and user cells must also be equal on the VD and VS sides of the ATM switch. The sending terminal cannot properly control the communication rate if these conditions are not met.

The quantity of flow of FRM cells sent from the sending terminal to the VD is sometimes reduced, causes of which include a malfunctioning sending terminal and malicious intent on the part of the user. In this case, essentially more user cells flow into the VD of the ATM switch than are supposed to. When there is a reduction in the flow of FRM cells, the VD of the ATM switch matches the ratio of FRM cells and user cells supplied to the VS to a preset value. Accordingly, the cell buffer of the ATM switch overflows. This overflow can have an adverse effect on other normal connections.

For instance, let us consider a case in which the band that can be used by one connection of an ABR service is 10 MHz and the ratio of user cells to RM cells is 9:1. In other words, the user cell band is 9 MHz and the RM cell band is 1 MHz. If an abnormality occurs at the sending terminal and the ratio of user cells to RM cells changes to 19:1 when an RM cell is sent, the user cell band becomes 9.5 MHz and the RM cell band 0.5 MHz. Here again, the VD sends the user cells and RM cells to the VS at a ratio of 9:1 as was specified in advance. Therefore, the VD receives the user cells at 9.5 MHz and sends them at 9 MHz. Consequently, there is excessive reception at the ATM switch, and congestion tends to occur. This congestion adversely effects the other connections of the ATM switch.

An ATM switch manages and controls cells through connection admission control, usage parameter control, or the like. Nevertheless, there are no provisions whatsoever for managing changes in the proportion of user cells and RM cells, nor has a method for managing this been developed.

SUMMARY OF THE INVENTION

It is an object of the present invention to provide a technique for preventing the overflow of an ATM exchange caused by a reduction in the flow of RM cells.

In accordance with first standpoint of present invention, the ATM exchange has an input line interface comprising means for deciding whether each ATM cell sent from a communication terminal to a switch is an FRM cell or a non-FRM cell, means for using the results of the decision to monitor the proportion of the FRM cells among the ATM cells and deciding whether the proportion is normal or abnormal, and means for discarding the non-FRM cells when the proportion is abnormal.

With the first invention, it is possible to prevent the overflow of an ATM exchange caused by a reduction in the flow of FRM cells.

In accordance with second standpoint of present invention, The ATM exchange has an output line interface comprising means for deciding whether each ATM cell sent from a communication terminal to a switch is a BRM cell or a non-BRM cell, means for using the results of the decision to monitor the proportion of the BRM cells among the ATM cells and deciding whether the proportion is normal or abnormal, and means for discarding the non-BRM cells when the proportion is abnormal.

With the second invention, it is possible to prevent the overflow of an ATM exchange caused by a reduction in the flow of BRM cells.

BRIEF DESCRIPTION OF THE DRAWINGS

Other objects and advantages of the present invention will be described through reference to the following appended figures.

FIG. 2 is a schematic illustrating the format of the cells used in the system of FIG. 1;

FIG. 7 is a table used to describe the operation of the output line interface shown in FIG. 3;

FIGS. 8A and 8B is a schematic used to describe the operation of the input line interface shown in FIG. 3; and FIG. 9 is a table used to describe the operation of the output line interface shown in FIG. 3.

DESCRIPTION OF THE PREFERRED EMBODIMENTS

Embodiments of the present invention will now be described using the figures. In the figures, the size, shape and arrangement relationship of the various structural components are only shown schematically so as to allow an understanding of the present invention, and the numerical conditions described below are nothing but examples.

Figure 1:
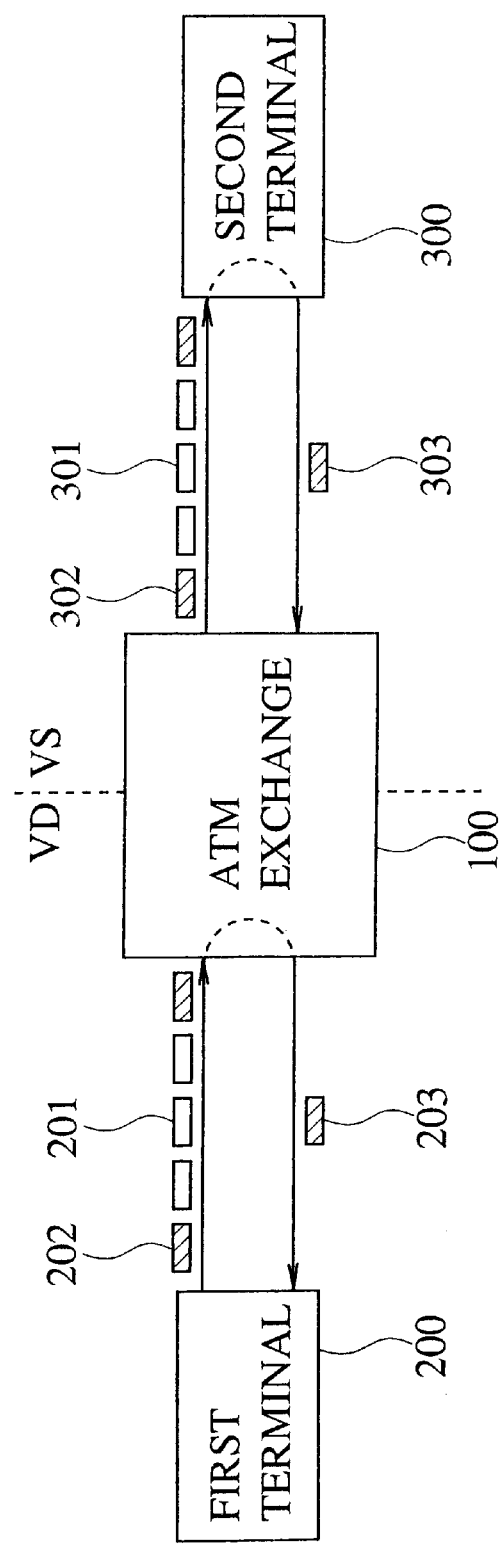
FIG. 1 is a schematic of a communication system using the ATM exchange of the present invention.

As shown in FIG. 1, the communication system to which the present invention is applied comprises an ATM exchange 100, a first terminal 200, and a second terminal 300.

In this embodiment, the first terminal 200 serves as the sending terminal, and the second terminal 300 as the receiving terminal.

The ATM exchange 100 constructs a virtual destination (VD) and a virtual source (VS) within a traffic control loop. The VD and VS divide the control loop into two segments, namely, a segment containing the first terminal 200 and the VD and a segment containing the VS and the second terminal 300. Dividing the control loop into a plurality of segments and managing the RM cells by segment allows for control that quickly accommodates changes in the state of network congestion.

In a normal state, the first terminal 200 sends one forward FRM cell 202 every time N number of user cells 201 are sent. The VD obtains about network congestion from the reception status of the user cells. Every time an FRM cell is received, the VD appends congestion information to this FRM cell 202 and sends it back to the first terminal 200 as a BRM cell 203. The first terminal 200 controls the sending rate by using the information it reads from the received BRM cells 203. Similarly, the VS sends one forward FRM cell 302 every time N number of user cells 301 are sent, and the second terminal 300 sends back to the VS the BRM cells 303 to which congestion information has been appended.

The ATM cells handled by this device 100 have a format as shown in FIG. 2.

An ATM cell comprises a header and a payload, that is, an information field. The header has generic flow control (GFC), a virtual path identifier (VPI), virtual channel identifier (VCI), payload type (PT), cell loss priority (CLP), and header error control (HEC). The payload has protocol ID (ID), direction (DIR), backwards explicit congestion notification cell (BN), congestion indication (CI), no indication (NI), request acknowledge (RA), reserve, explicit cell rate (ER), current cell rate (CCR), minimum cell rate (MCR), queue length (QL), sequence number (SN), and cyclic redundancy check-ID (CRC-ID).

When congestion occurs inside the ATM exchange 100, the ATM exchange 100 sets the CI bit of the passing FRM cell to "1," which notifies the network to the back that congestion has occurred. The second terminal 300 recognizes the occurrence of congestion from the CI bit of the received FRM cell, whereupon it sets the DIR bit of the BRM cell to "1" and sends it back to the ATM exchange 100. In addition, the ATM exchange 100 rewrites the ER of the BRM cell when congestion has occurred.

When the first terminal 200 receives the BRM cell, it changes the cell send rate on the basis of the value of the CI bit. Specifically, the terminal 200 lowers the cell send rate when the CI indicates that congestion has occurred, and raises the cell send rate when the CI indicates that congestion has not occurred. In addition, if the cell send rate at this point is larger than the ER, the terminal 200 changes the cell send rate so that it is smaller than the ER. If the ER is smaller than the MCR, then the cell send rate is set to the MCR.

Figure 3:
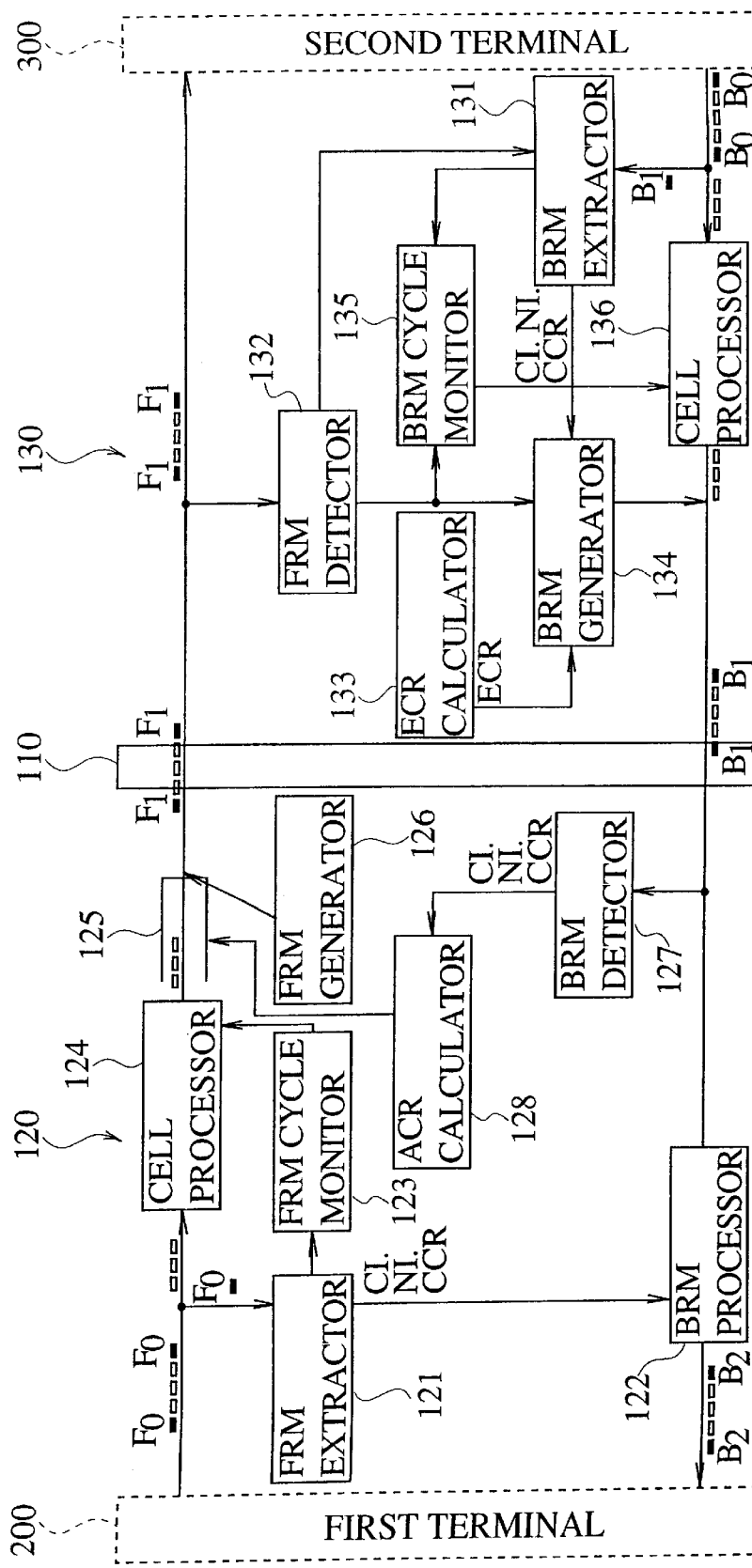
FIG. 3 is a block diagram illustrating the structure of the ATM exchange pertaining to an embodiment of the present invention.

As shown in FIG. 3, the ATM exchange 100 comprises a switch 110, an input line interface 120, and an output line interface 130.

Usually, both the first terminal 200 and the second terminal 300 control traffic by sending FRM cells and receiving BRM cells, respectively. Therefore, the ATM exchange is generally structured such that it can accommodate a case when the FRM cells are sent from the first terminal 200 side toward the second terminal 300, as well as a case when the FRM cells are sent from the second terminal 300 side toward the first terminal 200 side. In contrast, for the sake of simplifying the discussion, FIG. 3 only shows a structure for sending FRM cells from the first terminal 200 side toward the second terminal 300 side. Specifically, FIG. 3 only shows a mechanism for sending user cells and FRM cells from the first terminal 200 to the second terminal 300, and sending BRM cells from the second terminal 300 to the first terminal 200.

In the following description, the sending direction from the first terminal 200 to the second terminal 300 is called the forward direction, and the sending direction from the second terminal 300 to the first terminal 200 is called the backward direction. The first terminal 200 sends forward FRM cells and receives backward BRM cells. The second terminal 300 sends backward FRM cells and receives forward BRM cells.

The switch 110 sets the communication channel. The structure of the switch 110 may be the same as the switch in a conventional ATM exchange.

The interface 120 monitors the FRM cells inserted into the flow of forward ATM cells. Specifically, the interface 120 performs the management of the forward FRM cells within the VD and VS. As shown in FIG. 3, the interface 120 comprises an FRM extractor 121, a BRM processor 122, an FRM cycle monitor 123, a forward cell processor 124, a shaper 125, an FRM generator 126, a BRM detector 127, and an ACR (Allowed Cell Rate) calculator 128.

The FRM extractor 121 monitors the ATM cells sent from the first terminal 200 to the switch 110, and extracts the FRM cells. The FRM extractor 121 outputs "1" as a signal detf1 when the ATM cells are forward FRM cells, and outputs "0" as the signal detf1 when the ATM cells are forward user cells or forward BRM cells. In addition, when forward FRM cells are detected, the FRM extractor 121 extracts data from the payloads of these cells and sends this data to the BRM processor 122.

The BRM processor 122 appends the data inputted from the FRM extractor 121 to the backward BRM cells. The data extracted from the payloads of forward FRM cells is appended to the backward BRM cells corresponding to these FRM cells.

The FRM cycle monitor 123 monitors the cycles of the forward FRM cells. This monitoring of cycles is accomplished by checking the insertion intervals of the FRM cells in the forward ATM cell flow. The FRM cycle monitor 123 outputs a signal indicating the occurrence of an abnormality when this interval is so long that it violates the rule. The internal structure of the FRM cycle monitor 123 will be described using FIG. 4.

The forward cell processor 124 allows forward non-FRM cells (forward user cells and forward BRM cells) to pass when no abnormality has occurred. The forward cell processor 124 discards non-FRM cells when the FRM cycle monitor 123 has detected the occurrence of an abnormality.

The shaper 125 outputs forward non-FRM cells received from the cell processor 124 and forward FRM cells received from the FRM generator 126 according to the ACR (Allowed Cell Rate) inputted from the ACR calculator.

The FRM generator 126 generates forward FRM cells and supplies them to the shaper 125. Specifically, the FRM cells sent from the VS to the second terminal 300 are generated by the FRM generator 126.

The BRM detector 127 detects cells corresponding to the forward FRM cells to be monitored, from the backward BRM cells outputted by the switch 110. The BRM detector 127 extracts and outputs payload data from detected cells.

The ACR calculator 128 inputs payload data from the BRM detector 127 and calculates the ACR using this data. This ACR is sent to the shaper 125.

The interface 130 monitors the BRM cells inserted into the flow of backward cells. Specifically, the interface 130 performs the management of the backward BRM cells in the VD and VS. As shown in FIG. 3, the interface 130 comprises a BRM extractor 131, an FRM detector 132, an ECR (Explicit Cell Rate) calculator 133, a BRM generator 134, a BRM cycle monitor 135, and a backward cell processor 136.

The BRM extractor 131 monitors the ATM cells sent from the second terminal 300 to the switch 110, and extracts the backward BRM cells. The extractor 131 sets a signal detb to "1" when backward BRM cells are received. The BRM extractor 131 sets the signal detb to "0" when the FRM detector 132 has detected FRM cells. In addition, when backward BRM cells are detected, the extractor 131 extracts data from the payloads of these cells and sends this data to the BRM generator 134.

The FRM detector 132 detects the forward FRM cells sent from the switch 110. The FRM detector 132 sets a signal detf2 to "1" when forward cells have been detected. The signal detf2 is sent to the BRM generator 134 and the BRM cycle monitor 135.

The ECR calculator 133 monitors the congestion state of the switch 110 and calculates the explicit cell rate corresponding to this congestion state. The calculation result is sent to the BRM generator 134.

The BRM generator 134 generates backward BRM cells using the payload data inputted from the BRM extractor 131 and the allowable transmission rate inputted from the ECR calculator 133 when the detection signal detf2 has been inputted from the FRM detector 132. Specifically, the BRM cells sent from the VD to the first terminal 200 are generated by the BRM generator 134.

The BRM cycle monitor 135 monitors the cycles of the BRM cells in the backward ATM cells when the detection signal detf2 has been inputted from the FRM detector 132. This monitoring of cycles is accomplished by checking the insertion intervals of the BRM cells in the backward ATM cells. The monitor 135 outputs a signal indicating the occurrence of an abnormality when this interval is so long that it violates the rule. The internal structure of the BRM cycle monitor 135 will be described using FIG. 5.

The backward cell processor 136 allows backward non-BRM cells to pass unobstructed when no rule violation has occurred. The cell processor 136 discards non-BRM cells when the monitor 135 has detected the occurrence of a rule violation.

Figure 4:
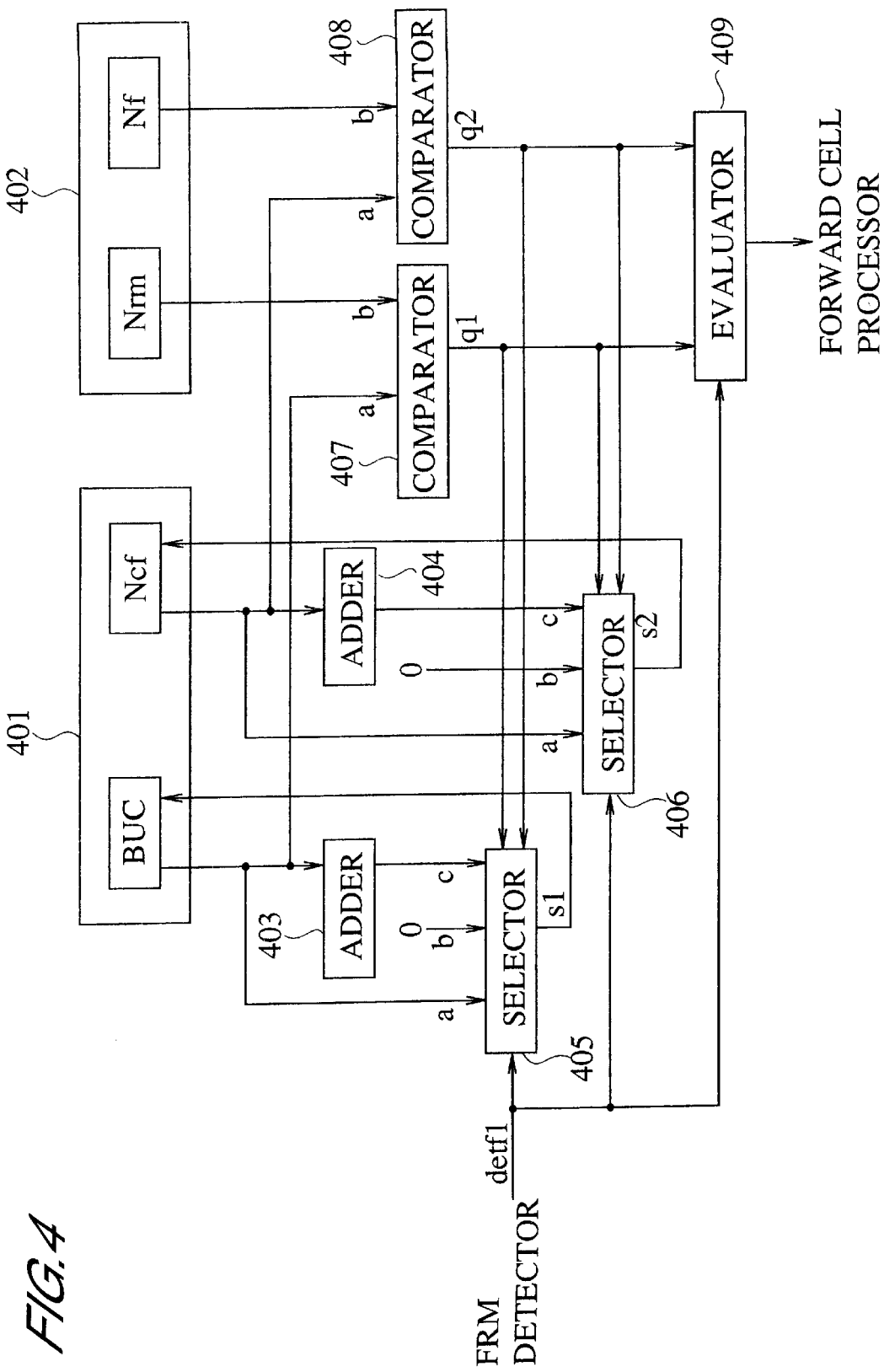
FIG. 4 is a block diagram illustrating the internal structure of the FRM cycle monitor shown in FIG. 3.

As shown in FIG. 4, the FRM cycle monitor 123 comprises memories 401 and 402, adders 403 and 404, selectors 405 and 406, comparators 407 and 408, and an evaluator 409.

The memory 401 is used to store two count values BUC and Ncf. BUC is the number of non-FRM forward cells continuously received. Ncf is the number of continuous occurrences of an FRM cell cycle abnormality. BUC is rewritten to the value indicated by the output signal s1 of the selector 405, and Ncf is rewritten to the value indicated by the output signal s2 of the selector 406.

The memory 402 is used to store two thresholds Nrm and Nf. Nrm is the specified value of the FRM cell insertion interval. Nf is the threshold of the number of occurrences Ncf.

The adder 403 outputs the sum of adding "1" to BUC.

The adder 404 outputs the sum of adding "1" to Ncf.

The selector 405 inputs BUC from an input terminal a, "0" from an input terminal b, and the output of the adder 403 from an input terminal c. The selector 405 selects the input terminal a, b, or c on the basis of the value of the signals detf1, q1, and q2. The signal of the selected terminal is outputted as the signal s1 from the selector 405.

The selector 406 inputs Ncf from an input terminal a, "0" from an input terminal b, and the output of the adder 404 from an input terminal c. The selector 406 selects the input terminal a, b, or c on the basis of the value of the signals detf1, q1, and q2. The signal of the selected terminal is outputted as the signal s2 from the selector 405.

The comparator 407 outputs the result of comparing BUC and Nrm as the signal q1. In the example in FIG. 4, we will let q1=1 when BUC<Nrm, and q1=0 when BUC≧Nrm.

The comparator 408 outputs the result of comparing Ncf and Nf as the signal q2. In the example in FIG. 4, we will let q2=1 when Ncf<Nf, and q2=0 when Ncf≧Nf.

The evaluator 409 uses the signals q1, q2, and detf1 to evaluate whether the cycle of the FRM cells is in violation of the rule.

Figure 5:
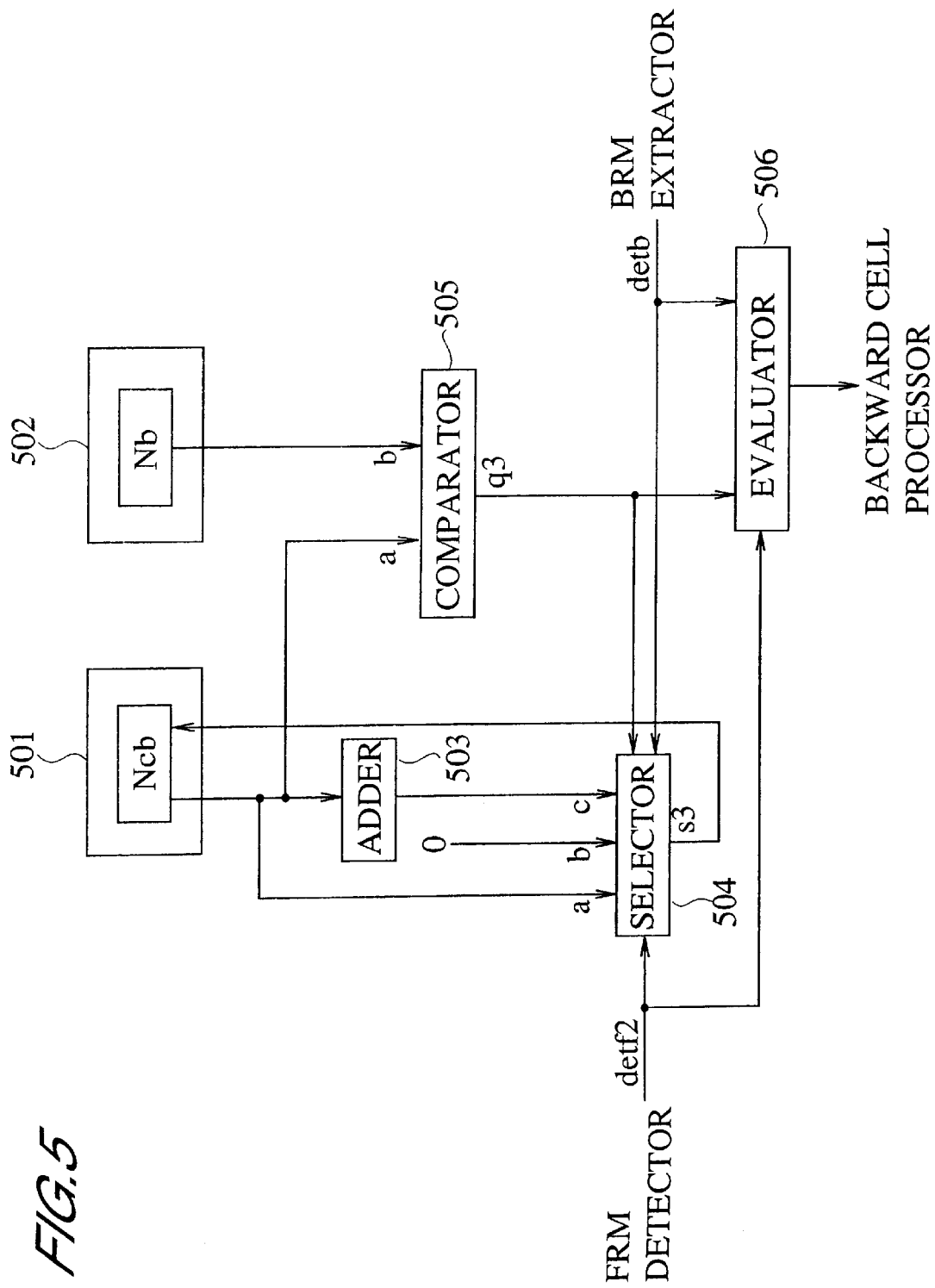
FIG. 5 is a block diagram illustrating the internal structure of the BRM cycle monitor shown in FIG. 3.

As shown in FIG. 5, the BRM cycle monitor 135 comprises memories 501 and 502, an adder 503, a selector 504, a comparator 505, and an evaluator 506.

The memory 501 is used to count Ncb, which is the number of continuous occurrences of a cycle abnormality in the BRM cells. Ncb is rewritten to the value indicated by the output signal s3 of the selector 504.

The memory 502 is used to store the threshold Nb of the number of occurrences Ncb.

The adder 503 outputs the sum of adding "1" to Ncb.

The selector 504 inputs Ncb from a terminal a, "0" from a terminal b, and the output of the adder 503 from a terminal c. The selector 504 selects the input terminal a, b, or c on the basis of the value of the signals detf2, detb, and q3. The signal of the selected terminal is outputted as the signal s3 from the selector 504.

The comparator 505 outputs the result of comparing Ncb and Nb as the signal q3. In the example in FIG. 5, we will let q3=1 when Ncb<Nb, and q3=0 when Ncb≧Nb.

The evaluator 506 uses the signals q3, detf2, and detb to evaluate whether the cycle of the BRM cells is in violation of the rule. The evaluator 506 performs its evaluation when the signal detf2 changes from "0" to "1" and when the signal detb changes from "0" to "1."

Next, the operating principle of the ATM exchange 100 will be described.

First, the operation of monitoring the cycle of forward FRM cells will be described. This monitoring of cycles is executed by the interface 120. The interface 120 executes this monitoring when an ATM cell has been received without loss. Specifically, this monitoring is executed when the ATM cells are in-rate cells. These ATM cells are in-rate cells when the CLP (Cell Loss Priority; see FIG. 2) in the ATM cells is "0."

In the following description, we will take as an example a case where the specified value Nrm is "4" and the threshold Nf is "2."

Figure 6A:
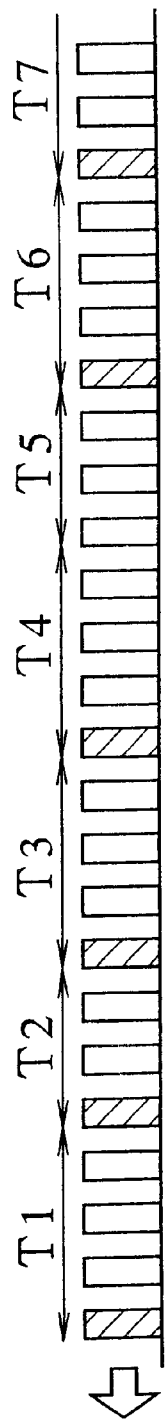
FIGS. 6A and 6B is a schematic used to describe the operation of the input line interface shown in FIG. 3.

First, FIG. 6A will be used to describe the operation of the interface 120 when the cycle of the forward FRM cells is normal. "When the cycle is normal" includes a case when the cycle of FRM cells is shorter than the specified value Nrm, and a case when the number of continuous occurrences of cycles longer than Nrm is less than Nf.

In the example shown in FIG. 6A, the length of the cycles T1, T3, and T6 is "4" and matches the specified value Nrm. The length of the cycle T2 is "3" which is shorter than the specified value Nrm. Although the cycles T4 and T5 are generated longer than Nrm, the number of continuous occurrences has not reached Nf in the case shown here.

In cycle T1, the FRM extractor 121 detects an FRM cell as the first ATM cell. As discussed above, the extractor 121 sets the signal detf1 to "1" when an FRM cell is detected. In this case, as shown in FIG. 7, the selector 405 selects terminal b, and therefore BUC is reset to "0." Similarly, the selector 406 selects terminal b, and therefore Ncf is reset to "0." When the signal detf1 is "1," the evaluator 409 decides that the proportion of FRM cells is normal and therefore outputs evaluation signal of low level.

Next, the extractor 121 detects a non-FRM forward cell as the second ATM cell, and sets the signal detf1 to "0." Since BUC=0 at this point, the comparison result of the comparator 407 is BUC<Nrm, and therefore q1=1. Here, in the monitor 123 shown in FIG. 3, the selector 405 selects terminal c and the selector 406 selects terminal a. Therefore, BUC is rewritten from "0" to "1," and Ncf is maintained at "0." When detf1=0 and q1=1, as shown in FIG. 7, the evaluator 409 does not change the evaluation result, and therefore the proportion of FRM cells is decided to be normal.

When the extractor 121 detects non-FRM forward cells as the third and fourth ATM cells, in each case BUC increases by "1" and Ncf is kept at "0."

Then, the FRM extractor 121 detects an FRM cell as the first ATM cell of cycle T2. As a result, the extractor 121 sets the signal detf1 to "1," and therefore BUC and Ncf are reset to "0."

When the extractor 121 detects non-FRM forward cells as the second and third ATM cells of cycle T2, just as in the case of cycle T1, BUC increases by "1" and Ncf is kept at "0." When the extractor 121 detects an FRM cell as the first ATM cell of cycle T3, BUC and Ncf are reset to "0." Therefore, even when the cycle of the FRM cells is shorter than Nrm, the monitor 123 decides that this cycle is normal. The subsequent operation in cycle T3 is the same as that in cycle T1.

In cycle T4, the operation of the extractor 121 and the monitor 123 up until the receipt of the fourth ATM cell is the same as in cycles T1 and T3.

In cycle T5, the extractor 121 detects a non-FRM forward cell as the first ATM cell. Since BUC=3 at this point, the comparison result of the comparator 407 is BUC<Nrm, and therefore q1=1. Accordingly, in the monitor 123 in FIG. 3, the selector 405 selects terminal c and the selector 406 selects terminal a. Since BUC is rewritten from "3" to "4," BUC=Nrm, and therefore the output signal q1 of the comparator 407 becomes "0." When detf1=0, q1=0, and q2=1, as shown in FIG. 7, the selector 405 selects terminal b and the selector 406 selects terminal c. Accordingly, BUC is reset to "0" and Ncf becomes "1." Here, since Ncf<Nf, the output signal q2 of the comparator 408 is maintained at "1." When detf1=0, q1=0, and q2=1, as shown in FIG. 7, the evaluator 409 does not change the evaluation result, and it is therefore decided that the proportion of FRM cells is normal. Specifically, even when the cycle of the FRM cells is longer than Nrm, the monitor 123 decides that this cycle is normal if Ncf is "1."

The operation of the extractor 121 and the monitor 123 when the second and third ATM cells have been received in cycle T5 is the same as when the first ATM cell has been received.

After this, when the extractor 121 detects an FRM cell as the first ATM cell in cycle T6, the BUC and Ncf of the monitor 123 are reset to "0."

From cycle T6 and beyond, the same operation as in cycles T1 to T5 is repeated, and the evaluator 409 maintains its decision that the cycles are normal.

As described above, in the example in FIG. 6A, the evaluator 409 always decides that the proportion of FRM cells is normal. This evaluation result is sent to the cell processor 124. The cell processor 124 allows the passage of non-FRM cells when this evaluation result is "normal." As a result, the various FRM cells are received as they are by the switch 110.

Figure 6B:
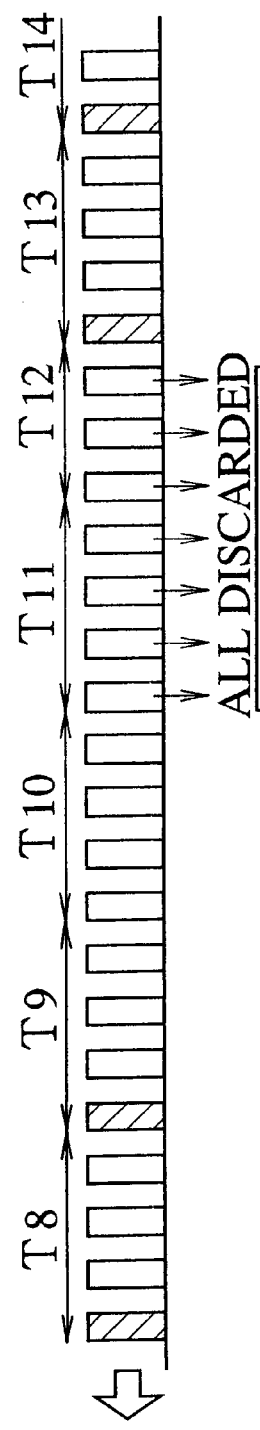

Next, FIG. 6B will be used to describe the operation of the interface 120 when an abnormality occurs in a forward FRM cell cycle.

Cycle T8 illustrates the state prior to the occurrence of an abnormality. The operation of the extractor 121 and the monitor 123 in cycle T8 is the same as that in cycle T1 in FIG. 6A.

In cycle T9, the operation of the extractor 121 and the monitor 123 up until the receipt of the ATM cells is the same as that in cycle T1.

In cycle T10, the extractor 121 detects a non-FRM forward cell as the first ATM cell. Since BUC=3 at this point, the comparison result of the comparator 407 is BUC<Nrm, and therefore q1=1. Accordingly, in the monitor 123 in FIG. 4, the selector 405 selects terminal c and the selector 406 selects terminal a. Since BUC is rewritten from "3" to "4," BUC=Nrm, and therefore the output signal q1 of the comparator 407 becomes "0." When detf1=0, q1=0, and q2=1, as shown in FIG. 7, the selector 405 selects terminal b and the selector 406 selects terminal c. Accordingly, BUC is reset to "0" and Ncf becomes "1." Here, since Ncf<Nf, the output signal q2 of the comparator 408 is maintained at "1." The evaluator 409 therefore decides that the proportion of FRM cells is normal.

The extractor 121 detects a non-FRM forward cell as the second ATM cell in cycle T10. Since BUC=0 at this point, the comparison result of the comparator 407 is BUC<Nrm, and therefore q1=1. Accordingly, BUC becomes "1" and Ncf is maintained at "1." The evaluator 409 decides that the proportion of FRM cells is normal.

Similarly, when the extractor 121 detects non-FRM forward cells as the second and third ATM cells of cycle T10, BUC increases by "1" and Ncf is kept at "1," and the evaluator 409 therefore decides that the proportion of FRM cells is normal.

Next, the extractor 121 detects a non-FRM forward cell as the fourth ATM cell of cycle T10. Since BUC=3 at this point, the comparison result of the comparator 407 is BUC<Nrm, and therefore q1=1. Accordingly, in the monitor 123 in FIG. 4, the selector 405 selects the output of the adder 403 and the selector 406 selects Ncf. Since BUC is rewritten from "3" to "4," BUC=Nrm, and therefore the output signal q1 of the comparator 4071[5] becomes "0." When detf1=0, q1=0, and q2=1, as shown in FIG. 7, the selector 405 selects terminal b and the selector 406[6] selects terminal c. Accordingly, BUC is reset to "0" and Ncf becomes "2." Here, since Ncf=Nf, the output signal q2 of the comparator 408[7] is changed to "0." As a result, since detf1=0, q1=0, and q2=0, the evaluator 409 decides that the proportion of FRM cells is abnormal.

The monitor 123 sends this evaluation result to the cell processor 124. Upon receiving this evaluation result, the cell processor 124 prohibits the passage of ATM cells. Specifically, ATM cells are discarded by the cell processor 124. This avoids the oversupply of user cells to the switch 110. Here, the shaper 125 permits the passage of ATM cells, so user cells that are supplied to the shaper 125 prior to the prohibition of passage by the cell processor 124 are sent to the switch 110.

After this, the extractor 121 resets the BUC and Ncf of the monitor 123 to "0" when an FRM cell is detected as the first ATM cell of T13. Therefore, the evaluator 409 decides that the proportion of FRM cells is normal. The monitor 123 sends this evaluation result to the cell processor 124. Upon receiving this evaluation result, the cell processor 124 permits the passage of ATM cells. This results in the second and subsequent ATM cells of cycle T13 being received by the switch 110.

Next, the operation of monitoring the cycles of backward BRM cells will be described. This monitoring of cycles is executed by the interface 130. The interface 130 monitors the cycles of backward BRM cells sent from the second terminal 300 to the switch 110 when the BRM generator 134 sends backward BRM cells. This monitoring is executed when the ATM cells are in-rate cells and when they are out-of-rate cells. The decision as to whether they are in-rate cells or out-of-rate cells is made according to the value of the CLP (see FIG. 2) in the ATM cells. The ATM cells are in-rate cells when CLP is "0," and are out-of-rate cells when CLP is "1."

In the following description, we will take as an example a case where the specified value of the insertion interval of the backward BRM cells is "4" and the threshold Nb for the number of continuous occurrences of insertion abnormality is "2."

First, FIG. 8A will be used to describe the operation of the interface 130 when the insertion interval of backward BRM cells is normal. "When the insertion interval is normal" includes a case when the insertion interval of FRM cells is shorter than the specified value, and a case when the number of continuous occurrences of insertion abnormality is less than Nb.

In FIG. 8A, the upper row illustrates the flow of ATM cells sent from the interface 130 to the switch 110. The timing at which the BRM generator 134 inserts the BRM cells substantially coincides with the timing at which the FRM detector 132 detects forward FRM cells. The lower row in FIG. 8A illustrates an example of the flow of ATM cells sent from the second terminal 200 to the interface 130.

In FIG. 8A, cycles T1, T2, T4, T5, and T6 illustrate cases when BRM cells are detected by the BRM extractor 131 from the time that the BRM generator 134 inserts a BRM cell until the next BRM cell is inserted. Cycle T3 illustrates a case when BRM cells are not detected by the BRM extractor 131 from the time that the BRM generator 134 inserts a BRM cell until the next BRM cell is inserted.

In cycle T1, the BRM extractor 131 extracts a BRM cell as the second ATM cell. The BRM extractor 131 sets the signal detb to "1" when a BRM cell is detected. Next, in cycle T2, the FRM detector 132 detects an FRM cell and sets the signal detf2 to "1." When detf2=1 and detb=1, as shown in FIG. 9, the selector 504 selects terminal b, and therefore the Ncb stored in the memory 501 is reset to "0." When the signal detf2 becomes "1," the BRM generator 134 generates a BRM cell and inserts it into the backward cell flow. In addition, when the signal detf2 becomes "1," the output signal detb of the BRM extractor returns to "0."

Next, the FRM detector 132 detects a non-ERM cell as the second ATM cell in cycle T2. At this point, the signal detf2 becomes "0." When detf2=0, as shown in FIG. 9, the selector 504 selects input terminal a. Therefore, Ncb is maintained at "0." The FRM detector 132 detects non-FRM cells as the third and fourth ATM cells in cycle T2. Here again, Ncb is maintained at "0."

The BRM extractor 131 extracts a BRM cell as the third ATM cell in cycle T2 and sets the signal detb to "1." The FRM detector 132 detects FRM cells in cycle T3 and sets the signal detf2 to "1." As a result, the selector 504 selects input terminal b, and therefore the Ncb stored in the memory 501 is reset to "0." Simultaneously with this, the BRM generator 134 generates a BRM cell and inserts it into the backward cell flow. Meanwhile, the output signal detb of the BRM extractor returns to "0."

In cycle T3, the BRM extractor 131 does not extract a BRM cell. Therefore, when the FRM detector 132 detects an FRM cell and sets the signal detf2 to "1" in cycle T4, the signal detb is "0." Since Ncb=0 at this point, Ncb<Nb, and therefore q3=1. Accordingly, as shown in FIG. 9, the evaluator 506 outputs "normal" as the evaluation result. When detf2=1, detb=0, and q3=1, the selector 503 selects input terminal c. Therefore, Ncf increases from "0" to "1." Even after Ncf has increased to "1," Ncb<Nb, and therefore q3 is maintained at 1.

The BRM extractor 131 extracts a BRM cell as the second ATM cell and sets the signal detb to "1" in cycle T4. The FRM detector 132 detects FRM cells and sets the signal detf2 to "1" in cycle T5. As a result, the selector 504 selects input terminal b, and therefore Ncb is reset to "0."

The operation after this is more or less the same as in cycles T1, T2, and so on, and will therefore not be described.

Next, FIG. 8B will be used to describe the operation of the interface 130 when the insertion interval of backward BRM cells is abnormal.

In FIG. 8B, the upper row is the same as the upper row in FIG. 8A, and illustrates the flow of backward cells after the insertion of BRM cells by the BRM generator 134. The lower row in FIG. 8B illustrates an example of the timing at which the BRM extractor 131 detects BRM cells.

In FIG. 8B, cycles T7, T11, and T12 are cases when the insertion interval of BRM cells is normal, and abnormal insertion intervals are formed in cycles T8, T9, and T10.

In cycle T7, the BRM extractor 131 extracts a BRM cell as the second ATM cell and sets the signal detb to "1." Next, in cycle T8, the FRM detector 132 detects FRM cells and sets the signal detf2 to "1." Therefore, since the selector 504 selects terminal b, Ncb is reset to "0." The output signal detb of the BRM detector returns to "0."

The BRM extractor 131 does not extract BRM cells in cycle T8, and therefore when in cycle T9 the FRM detector 132 detects FRM cells and sets the signal detf2 to "1," the signal detb is "0." Since Ncb=0 at this point, Ncb<Nb, and therefore q3=1. Accordingly, as shown in FIG. 9, the evaluator 506 outputs "normal" as the evaluation result. When detf2=1, detb=0, and q3=1, the selector 503 selects input terminal c. Therefore, Ncf increases from "0" to "1." Even after Ncf has increased to "1," Ncb<Nb, and therefore q3 is maintained at 1.

The BRM extractor 131 does not extract BRM cells in cycle T9, and therefore when in cycle T10 the FRM detector 132 detects FRM cells and sets the signal detf2 to "1," the signal detb is "0." Since Ncb=1 at this point, Ncb<Nb, and therefore q3=1. Therefore, since the selector 503 selects input terminal c, Ncf increases from "1" to "2." When Ncf=2, that is, when Ncb=Nb, q3=0. When detf2=1, detb=0, and q3=0, as shown in FIG. 9, the evaluator 506 outputs "abnormal" as the evaluation result. The cell processor 136 discards any received non-BRM backward cells when this evaluation result is "abnormal."

In cycle T11, when the FRM detector 132 detects an FRM cell, the signal detf2 becomes "1." Here, since detb=0 and q3=0, the evaluation result is maintained at "abnormal."

Next, when the BRM extractor 131 extracts a BRM cell as the second ATM cell in cycle T11, the signal detb becomes "1." Here, since the FRM detector 132 detects a non-FRM forward cell, the signal detf2 becomes "0." When detf2=0 and detb=1, as shown in FIG. 9, the evaluation result of the evaluator 506 becomes "normal," so the cell processor 136 stops the discarding of the received non-BRM backward cells and allows the cells to be outputted. When detf2=0 and detb=1, the selector 504 selects input terminal a, so Ncb is reset to "0."

The operation after this is more or less the same as the normal operation illustrated in FIG. 8A, and will therefore not be described.

As described above, the ATM exchange of this embodiment is such that the cell processors 124 and 136 discard excessive cells when an abnormality occurs in the insertion interval of the FRM cells or BRM cells, so no congestion occurs.

With this embodiment, a device corresponding both to when FRM cells are sent from the first terminal 200 toward the second terminal 300, and when FRM cells are sent from the second terminal 300 toward the first terminal 200 was employed as the ATM exchange. The present invention, however, can also be applied to a communication system in which only FRM cells are sent from a first terminal to a second, and only BRM cells are sent from the second terminal to the first.

The internal structure of the FRM cycle monitor 123 and the BRM cycle monitor 135 is not limited to the structures shown in FIGS. 4 and 5. With this embodiment, the monitors 123 and 135 were structured such that the number of cycles in which RM cells were not inserted was compared to a threshold value, but it is also possible for the monitors to be structured such that the continuous number of non-FRM cells or non-BRM cells is compared to a threshold value.

What is claimed is:

1. An ATM exchange, having an input line interface comprising:
    a decider that makes a decision whether each ATM cell sent from a communication terminal to a switch is an FRM cell or a non-FRM cell;
    a monitor that monitors a proportion of a number of said FRM cells to a number of said ATM cells by using the results of said decision, and decides whether said proportion is normal or abnormal; and
    a discarder that discards said non-FRM cells when said proportion is abnormal, so that said proportion becomes normal.

2. The ATM exchange according to claim 1, wherein said decider extracts said FRM cells from among said ATM cells.

3. The ATM exchange according to claim 1, wherein said monitor continually counts a number of said ATM cells from an FRM cell to the non-FRM cell just before the next FRM cell.

4. The ATM exchange according to claim 3, wherein said monitor compares a result of said counting with a first threshold; compares a number of continuous instances of said result of counting being larger than said first threshold to a second threshold; and decides that said proportion is abnormal when said number of continuous instances has reached said second threshold.

5. The ATM exchange according to claim 4, wherein said monitor comprises:
    a first storage that stores a number of receptions of said non-FRM cells;
    a second storage that stores said number of continuous instances;
    a third storage that stores said first threshold;
    a fourth storage that stores said second threshold;
    a first controller that increments said number of receptions according to the number of receptions of said non-FRM cells and resets said number of receptions when said FRM cell is received;
    a first comparator that compares said number of receptions to said first threshold;
    a second controller that increments said number of continuous instances according to the number of times said number of receptions has reached said first threshold and resets said number of continuous instances when said FRM cell is received;
    a second comparator that compares said number of continuous instances to said second threshold; and
    an evaluator that judges whether said proportion is normal or abnormal by using the decision result of said decider, the result of comparing said number of receptions to said first threshold, and the result of comparing said number of continuous instances to said second threshold.

6. The ATM exchange according to claim 1, said non-FRM cells contain user cells.

7. The ATM exchange according to claim 1, comprising as said input line interface:
    a first input line interface for processing said FRM cells sent from a first communication terminal to a second communication terminal; and
    a second input line interface for processing said FRM cells sent from said second communication terminal to said first communication terminal.

8. The ATM exchange according to claim 7, said non-FRM cells contain user cells and BRM cells.

9. The ATM exchange according to claim 1, performing communication by utilizing an available bit rate service.

10. The ATM exchange according to claim 1, performing communication by constructing a virtual destination and a virtual source within a control loop.

11. An ATM exchange, having an output line interface comprising:
- a decider that makes a decision whether each ATM cell sent from a communication terminal to a switch is a BRM cell or a non-BRM cell;
- a monitor that monitors a proportion of a number of said BRM cells to a number of said ATM cells by using the results of said decision, and decides whether said proportion is normal or abnormal; and
- a discarder that discards said non-BRM cells, when said proportion is abnormal, so that said proportion becomes normal.

12. The ATM exchange according to claim 11, wherein said decider extracts said BRM cells from among said ATM cells.

13. The ATM exchange according to claim 12, wherein said monitor decides whether said proportion is normal or abnormal by comparing the timing at which the FRM cells are sent to the timing at which said BRM cells are received.

14. The ATM exchange according to claim 13, wherein said monitor decides that an abnormal insertion of said BRM cell occurred when said FRM cell was sent without said BRM cell being received, and detects an abnormality of said proportion by comparing a number of instances of said abnormal insertion to a threshold.

15. The ATM exchange according to claim 14, wherein said monitor comprises:
- a first storage that stores a number of continuous instances of said abnormal insertion;
- a second storage that stores said threshold;
- a controller that increments said number of continuous instances when said FRM cell is sent without said BRM cell being received, and resets said number of continuous instances when said FRM cell is sent after said BRM cell, has been received;
- a comparator that compares said number of continuous instances to said threshold; and
- an evaluator that decides whether said proportion is normal or abnormal by using the decision result of said decider, the comparison result of said comparator, and a signal indicating the timing at which said FRM cells are sent.

16. The ATM exchange according to claim 11, said non-BRM cells contain user cells.

17. The ATM exchange according to claim 11, comprising as said input line interface:
- a first output line interface for processing said BRM cells sent from a first communication terminal to a second communication terminal; and
- a second output line interface for processing said BRM cells sent from said second communication terminal to said first communication terminal.

18. The ATM exchange according to claim 17, said non-BRM cells contain user cells and FRM cells.

19. The ATM exchange according to claim 11, performing communication by utilizing an available bit rate service.

20. The ATM exchange according to claim 11, performing communication by constructing a virtual destination and a virtual source within a control loop.

* * * * *

UNITED STATES PATENT AND TRADEMARK OFFICE
CERTIFICATE OF CORRECTION

PATENT NO. : 6,643,264 B1
DATED : November 4, 2003
INVENTOR(S) : Satoshi Furusawa et al.

It is certified that error appears in the above-identified patent and that said Letters Patent is hereby corrected as shown below:

<u>Title page,</u>
Item [73], Assignee, insert -- Tokyo -- after "Ltd.".

Signed and Sealed this

Twenty-third Day of March, 2004

JON W. DUDAS
*Acting Director of the United States Patent and Trademark Office*